United States Patent
Tanaka et al.

(10) Patent No.: US 12,202,987 B2
(45) Date of Patent: Jan. 21, 2025

(54) RADIATION CURABLE INK JET COMPOSITION AND INK SET

(71) Applicant: Seiko Epson Corporation, Tokyo (JP)

(72) Inventors: Kyohei Tanaka, Matsumoto (JP); Midori Sekine, Matsumoto (JP); Chigusa Sato, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 127 days.

(21) Appl. No.: 17/570,412

(22) Filed: Jan. 7, 2022

(65) Prior Publication Data

US 2022/0220326 A1  Jul. 14, 2022

(30) Foreign Application Priority Data

Jan. 8, 2021 (JP) ................... 2021-002112

(51) Int. Cl.
- C09D 11/10 (2014.01)
- C09D 11/107 (2014.01)
- C09D 11/322 (2014.01)
- C09D 11/40 (2014.01)

(52) U.S. Cl.
CPC .......... C09D 11/107 (2013.01); C09D 11/322 (2013.01); C09D 11/40 (2013.01)

(58) Field of Classification Search
None
See application file for complete search history.

(56) References Cited

U.S. PATENT DOCUMENTS

| | | | | |
|---|---|---|---|---|
| 8,480,203 B2* | 7/2013 | Van Thillo | ........... | B41J 2/17503 347/100 |
| 8,529,049 B2* | 9/2013 | De Voeght | ........... | C09D 11/101 347/85 |
| 8,664,297 B2* | 3/2014 | Fujii | ........... | C09D 11/40 524/548 |
| 8,757,789 B2* | 6/2014 | Van Thillo | ........... | B41J 2/01 347/100 |
| 8,979,256 B2* | 3/2015 | Verdonck | ........... | C09D 11/54 347/100 |
| 9,004,663 B2* | 4/2015 | Van Thillo | ........... | C09D 11/40 430/281.1 |
| 9,034,939 B2* | 5/2015 | Kito | ........... | C09D 11/54 520/1 |
| 9,453,135 B2* | 9/2016 | André | ........... | C09D 11/322 |
| 9,475,950 B2* | 10/2016 | Umebayashi | ........... | B41J 2/2107 |
| 9,718,975 B2* | 8/2017 | Nerad | ........... | C09D 11/322 |
| 9,884,973 B2* | 2/2018 | Okamoto | ........... | C09D 11/40 |
| 10,000,649 B2* | 6/2018 | Okamoto | ........... | C09D 11/38 |
| 10,364,362 B2* | 7/2019 | Blaskett | ........... | B41J 2/01 |
| 11,230,647 B2* | 1/2022 | Nakashima | ........... | C08K 3/36 |
| 2009/0214797 A1 | 8/2009 | Kasai | | |
| 2017/0218216 A1 | 8/2017 | Kubota et al. | | |
| 2019/0359836 A1 | 11/2019 | Yamaguchi et al. | | |

FOREIGN PATENT DOCUMENTS

| | | | | |
|---|---|---|---|---|
| CN | 107011737 A | 8/2017 | | |
| EP | 2093265 A1 | 8/2009 | | |
| JP | 2009-067955 A | 4/2009 | | |
| JP | 2009-197173 A | 9/2009 | | |
| WO | WO-0194482 A1 * | 12/2001 | ............. | C09D 11/40 |
| WO | WO-2008139188 A1 * | 11/2008 | ........... | C09D 11/101 |
| WO | 2009/098509 A1 | 8/2009 | | |
| WO | 2009/133402 A1 | 11/2009 | | |
| WO | WO-2018030027 A1 * | 2/2018 | ................ | B41J 2/01 |
| WO | 2018/131400 A1 | 7/2018 | | |

* cited by examiner

*Primary Examiner* — Sanza L. McClendon
(74) *Attorney, Agent, or Firm* — Harness, Dickey & Pierce, P.L.C.

(57) ABSTRACT

A radiation curable ink jet composition includes polymerizable compounds and a colorant, the polymerizable compounds includes a monofunctional polymerizable compound in an amount of 78 percent by mass or more with respect to a total mass of the polymerizable compounds, and the colorant includes at least one selected from the group consisting of C.I. Pigment Orange 36, C.I. Pigment Orange 38, C.I. Pigment Orange 43, C.I. Pigment Orange 64, C.I. Pigment Orange 71, C.I. Pigment Red 177, C.I. Pigment Red 179, C.I. Pigment Red 224, C.I. Pigment Red 254, C.I. Pigment Red 255, C.I. Pigment Violet 23, C.I. Pigment Violet 32, C.I. Pigment Violet 37, C.I. Pigment Violet 39, C.I. Pigment Green 7, C.I. Pigment Green 36, C.I. Pigment Blue 15:6, C.I. Pigment Blue 25, and C.I. Pigment Blue 60.

5 Claims, No Drawings

RADIATION CURABLE INK JET COMPOSITION AND INK SET

The present application is based on, and claims priority from JP Application Serial Number 2021-002112, filed Jan. 8, 2021, the disclosure of which is hereby incorporated by reference herein in its entirety.

BACKGROUND

1. Technical Field

The present disclosure relates to a radiation curable ink jet composition and an ink set.

2. Related Art

In recent years, in order to form an image having, for example, high water resistance, solvent resistance, and abrasion resistance on a surface of a recording medium, in an ink jet type recording method, a radiation curable ink jet composition to be cured when being irradiated with radioactive rays has been used.

In addition, in order to increase a coverage of the color gamut in an image formed by a radiation curable ink jet composition, an ink (specific color ink) having a color different from those of a cyan ink, a magenta ink, a yellow ink, and a black ink which have been generally used has been investigated.

For example, International Publication No. 2018/131400 has disclosed an ultraviolet curable orange ink containing a pigment such as C.I. Pigment Orange 36 and a polyfunctional photopolymerizable compound, such as tripropylene glycol diacrylate (TPGDA) or trimethylolpropane triacrylate (TMPTA).

However, even if an image in which the coverage of the color gamut is increased using a specific color ink is formed, in the case in which the printed matter formed as described above is installed outside, a problem in that a printed coating film is liable to be cracked may arise. On the other hand, in order to prevent the printed coating film from being cracked, when an image is formed without using a specific color ink, the coverage of the color gamut cannot be increased. Hence, while the coverage of the color gamut is increased, the printed coating film is required to be prevented from being cracked (coating film cracking) when being installed outside.

SUMMARY

According to an aspect of the present disclosure, there is provided a radiation curable ink jet composition comprising: polymerizable compounds; and a colorant. In the radiation curable ink jet composition described above, the polymerizable compounds includes a monofunctional polymerizable compound in an amount of 78 percent by mass or more with respect to a total mass of the polymerizable compounds, and the colorant includes at least one selected from the group consisting of C.I. Pigment Orange 36, C.I. Pigment Orange 38, C.I. Pigment Orange 43, C.I. Pigment Orange 64, C.I. Pigment Orange 71, C.I. Pigment Red 177, C.I. Pigment Red 179, C.I. Pigment Red 224, C.I. Pigment Red 254, C.I. Pigment Red 255, C.I. Pigment Violet 23, C.I. Pigment Violet 32, C.I. Pigment Violet 37, C.I. Pigment Violet 39, C.I. Pigment Green 7, C.I. Pigment Green 36, C.I. Pigment Blue 15:6, C.I. Pigment Blue 25, and C.I. Pigment Blue 60.

According to another aspect of the present disclosure, there is provided an ink set comprising: a cyan ink composition; a magenta ink composition; a yellow ink composition; a black ink composition; and the radiation curable ink jet composition according to the aspect described above.

DESCRIPTION OF EXEMPLARY EMBODIMENTS

Hereinafter, embodiments of the present disclosure will be described. The following embodiments are to explain examples of the present disclosure. The present disclosure is not limited to the following embodiments, and various modified embodiments are also included in the present disclosure as long as without departing from the scope thereof. In addition, all compositions to be described below are not always required to be essential compositions of the present disclosure.

1. Radiation Curable Ink Jet Composition

A radiation curable ink jet composition according to one embodiment of the present disclosure comprises polymerizable compounds and a colorant. In the radiation curable ink jet composition described above, the polymerizable compounds includes a monofunctional polymerizable compound in an amount of 78 percent by mass or more with respect to a total mass of the polymerizable compounds, and the colorant includes at least one (hereinafter, referred to as "specific pigment" in some cases) selected from the group consisting of C.I. Pigment Orange 36, C.I. Pigment Orange 38, C.I. Pigment Orange 43, C.I. Pigment Orange 64, C.I. Pigment Orange 71, C.I. Pigment Red 177, C.I. Pigment Red 179, C.I. Pigment Red 224, C.I. Pigment Red 254, C.I. Pigment Red 255, C.I. Pigment Violet 23, C.I. Pigment Violet 32, C.I. Pigment Violet 37, C.I. Pigment Violet 39, C.I. Pigment Green 7, C.I. Pigment Green 36, C.I. Pigment Blue 15:6, C.I. Pigment Blue 25, and C.I. Pigment Blue 60.

Even if an image in which the coverage of the color gamut is increased is formed by using a specific color ink which contains a specific pigment as the colorant, when the printed matter formed as described above is installed outside, a printed coating film is liable to be cracked. On the other hand, when an image is formed without using the specific color ink which contains a specific pigment as the colorant, the coverage of the color gamut cannot be increased. However, according to the radiation curable ink jet composition (hereinafter, referred to as "ink jet composition" or simply "composition" in some cases) of this embodiment, since the specific pigment is contained as the colorant, the coverage of the color gamut is increased, and since the monofunctional polymerizable compound is contained in a predetermined amount or more with respect to the total mass (100 percent by mass) of the polymerizable compounds, a stretching property of a coating film is improved, so that a printed coating film installed outside can be prevented from being cracked (coating film cracking). That is, according to the radiation curable ink jet composition of this embodiment, the coverage of the color gamut can be increased, and in addition, a radiation curable ink jet composition capable of protecting the color gamut thus expanded can be provided.

Hereinafter, the components contained in the radiation curable ink jet composition according to this embodiment will be described.

1.1. Polymerizable Compound

The radiation curable ink jet composition according to this embodiment includes, as the polymerizable compound, a monofunctional polymerizable compound (hereinafter, referred to as "monofunctional monomer" in some cases) in an amount of 78 percent by mass or more with respect to the total mass of the polymerizable compounds.

1.1.1. Monofunctional Polymerizable Compound

A content of the monofunctional polymerizable compound contained in the radiation curable ink jet composition according to this embodiment with respect to the total mass (100 percent by mass) of the polymerizable compounds is 78 percent by mass or more, preferably 82 percent by mass or more, more preferably 90 percent by mass or more, and further preferably 93 percent by mass or more. When the content of the monofunctional monomer is in the range described above, the stretching property of the coating film is improved, and even if being installed outside, the coating film can be prevented from being cracked. In addition, although an upper limit of the content of the monofunctional polymerizable compound is not particularly limited, the upper limit thereof with respect to the total mass (100 percent by mass) of the polymerizable compounds is preferably 99 percent by mass or less, more preferably 98 percent by mass or less, and further preferably 97 percent by mass or less. Since the content of the monofunctional monomer with respect to the total mass of the polymerizable compounds is 99 percent by mass or less, an abrasion resistance of the coating film tends to be further improved.

In addition, a content of the monofunctional monomer with respect to a total mass (100 percent by mass) of the composition is preferably 70 percent by mass or more, more preferably 80 percent by mass or more, and further preferably 82 percent by mass or more. Since the content of the monofunctional monomer with respect to the total mass of the composition is 70 percent by mass or more, a flexibility and an adhesive property of the coating film tend to be further improved. In addition, an upper limit of the content of the monofunctional monomer with respect to the total mass (100 percent by mass) of the composition is preferably 92 percent by mass or less, more preferably 90 percent by mass or less, and further preferably 88 percent by mass or less. Since the content of the monofunctional monomer with respect to the total mass of the composition is 92 percent by mass or less, the abrasion resistance of the coating film tends to be further improved.

Although the monofunctional polymerizable compound contained in the radiation curable ink jet composition according to this embodiment is not particularly limited, for example, there may be mentioned a monofunctional acrylate having a polycyclic hydrocarbon group, a nitrogen-containing monofunctional monomer, an aromatic group-containing monofunctional monomer, or a saturated aliphatic group-containing monofunctional monomer. In addition, in needed, other monofunctional monomers may also be contained. Although the other monofunctional monomers are not particularly limited, for example, a known monofunctional monomer having a polymerizable functional group, in particular, having a polymerizable functional group with an unsaturated double bond between carbon atoms, may be used.

Hereinafter, although the monofunctional monomer will be described by way of example, the monofunctional monomer of this embodiment is not limited thereto.

In addition, in this specification, "(meth)acryloyl" represents at least one of an acryloyl and a methacryloyl corresponding thereto, "(meth)acrylate" represents at least one of an acrylate and a methacrylate corresponding thereto, and "(meth)acryl" represents at least one of an acryl and a methacryl corresponding thereto.

1.1.1.1. Monofunctional Acrylate Having Polycyclic Hydrocarbon Group

Although the monofunctional acrylate having a polycyclic hydrocarbon group is not particularly limited, for example, there may be mentioned an acrylate, such as dicyclopentenyl acrylate (DCPA) or dicyclopentenyl oxyethyl acrylate, having an unsaturated polycyclic hydrocarbon group; or an acrylate, such as dicyclopentanyl acrylate or isobornyl acrylate (IBXA), having a saturated polycyclic hydrocarbon group. Among those mentioned above, the acrylate having a saturated polycyclic hydrocarbon group is preferable, and at least isobornyl acrylate (IBXA) is more preferably contained. Since the monofunctional acrylate having a polycyclic hydrocarbon group as described above is used, the abrasion resistance of the coating film tends to be further improved.

A content of the monofunctional acrylate having a polycyclic hydrocarbon group with respect to the total mass (100 percent by mass) of the polymerizable compounds is preferably 5 to 45 percent by mass, more preferably 10 to 40 percent by mass, and further preferably 15 to 35 percent by mass. Since the content of the monofunctional acrylate having a polycyclic hydrocarbon group with respect to the total mass of the polymerizable compounds is in the range described above, the abrasion resistance of the coating film tends to be further improved.

A content of the monofunctional acrylate having a polycyclic hydrocarbon group with respect to the total mass (100 percent by mass) of the composition is preferably 5 to 40 percent by mass, more preferably 10 to 40 percent by mass, and further preferably 15 to 35 percent by mass. Since the content of the monofunctional acrylate having a polycyclic hydrocarbon group with respect to the total mass of the composition is in the range described above, the abrasion resistance of the coating film tends to be further improved.

1.1.1.2. Nitrogen-Containing Monofunctional Monomer

Although the nitrogen-containing monofunctional monomer is not particularly limited, for example, there may be mentioned a nitrogen-containing monofunctional vinyl monomer, such as N-vinylcaprolactam (NVC), vinyl methyl oxazolidinone (VMOX), N-vinylformamide, N-vinylcarbazole, N-vinylacetamide, or N-vinylpyrrolidone; a nitrogen-containing monofunctional acrylate monomer such as acryloylmorpholine (ACMO); or a nitrogen-containing monofunctional acrylamide monomer, such as (meth)acrylamide, N-hydroxymethyl (meth)acrylamide, diacetone (meth)acrylamide, N,N-dimethyl (meth)acrylamide, or a (meth)acrylamide derived, for example, from dimethylamino ethylacrylate, benzyl chloride quaternary. In addition, in the present disclosure, an "N-vinyl compound" represents the nitrogen-containing monofunctional vinyl monomer, and the nitrogen-containing monofunctional acrylate monomer and the nitrogen-containing acrylamide monomer are regarded not to be included therein.

Among those mentioned above, one of the nitrogen-containing monofunctional vinyl monomer and the nitrogen-containing monofunctional acrylate monomer is preferably contained, and a monomer, such as N-vinylcaprolactam (NVC), vinyl methyl oxazolidinone (VMOX), N-vinylcarbazole, N-vinylpyrrolidone, or acryloylmorpholine (ACMO), having a nitrogen heterocyclic structure is more preferable, and acryloylmorpholine (ACMO) is further preferably contained.

Since the nitrogen-containing monofunctional monomer as described above is used, the abrasion resistance of the coating film tends to be further improved. Furthermore, the nitrogen-containing monofunctional vinyl monomer, such as N-vinylcaprolactam, having a nitrogen heterocyclic structure further improves the flexibility of the coating film, and the nitrogen-containing monofunctional acrylate monomer, such as acryloylmorpholine, having a nitrogen heterocyclic structure tends to further reduce an odor of the composition.

A content of the nitrogen-containing monofunctional monomer with respect to the total mass (100 percent by mass) of the polymerizable compounds is preferably 5 to 40 percent by mass, more preferably 5 to 35 percent by mass, and further preferably 5 to 30 percent by mass. Since the content of the nitrogen-containing monofunctional monomer with respect to the total mass of the polymerizable compounds is 5 percent by mass or more, the abrasion resistance of the coating film tends to be further improved. In addition, since the content of the nitrogen-containing monofunctional monomer with respect to the total mass of the polymerizable compounds is 40 percent by mass or less, the adhesive property of the coating film tends to be further improved.

A content of the nitrogen-containing monofunctional monomer with respect to the total mass (100 percent by mass) of the composition is preferably 5 to 35 percent by mass, more preferably 5 to 30 percent by mass, and further preferably 5 to 25 percent by mass. Since the content of the nitrogen-containing monofunctional monomer with respect to the total mass of the composition is 5 percent by mass or more, the abrasion resistance of the coating film tends to be further improved. In addition, since the content of the nitrogen-containing monofunctional monomer with respect to the total mass of the composition is 35 percent by mass or less, the adhesive property of the coating film tends to be further improved.

In addition, a content of the N-vinyl compound with respect to the total mass (100 percent by mass) of the polymerizable compounds is preferably 5 percent by mass or less, more preferably 4 percent by mass or less, further preferably 3 percent by mass or less, and specifically preferably 2.5 percent by mass or less. When the content of the N-vinyl compound is in the range described above, since the coating film to be obtained is made smoother, a color development property of the coating film tends to be improved.

A content of the N-vinyl compound with respect to the total mass (100 percent by mass) of the composition is preferably 5 percent by mass or less, more preferably 4 percent by mass or less, further preferably 3 percent by mass or less, and specifically preferably 2.5 percent by mass or less. When the content of the N-vinyl compound is in the range described above, since the coating film to be obtained is made smoother, the color development property of the coating film tends to be improved.

1.1.1.3. Aromatic Group-Containing Monofunctional Monomer

Although the aromatic group-containing monofunctional monomer is not particularly limited, for example, there may be mentioned phenoxyethyl (meth)acrylate, benzyl (meth)acrylate, an alkoxylated 2-phenoxyethyl (meth)acrylate, ethoxylated nonylphenyl (meth)acrylate, an alkoxylated nonylphenyl (meth)acrylate, a p-cumylphenol EO-modified (meth)acrylate, or 2-hydroxy-3-phenoxypropyl (meth)acrylate. Among those mentioned above, phenoxyethyl (meth)acrylate or benzyl (meth)acrylate is preferable, phenoxyethyl (meth)acrylate is more preferable, and phenoxyethyl acrylate (PEA) is further preferable. Since the aromatic group-containing monofunctional monomer as described above is used, a solubility of a polymerization initiator is further improved, and the curing property of the composition tends to be further improved. In particular, when an acylphosphine oxide-based polymerization initiator or a thioxanthone-based polymerization initiator is used, the solubility thereof tends to be improved. In addition, by using phenoxyethyl (meth)acrylate, the odor of the composition tends to be further reduced.

In addition, in this embodiment, the aromatic group-containing monofunctional monomer is regarded not to be included in the compound having a polycyclic hydrocarbon group.

When the aromatic group-containing monofunctional monomer is represented by way of example by a different expression, as the aromatic group-containing monofunctional monomer, compounds represented by the following formulas (1) and (2) may be mentioned.

$$CH_2=CR^4—COOR^5—Ar \quad (1)$$

$$CH_2=CR^4—COO—Ar \quad (2)$$

In the above formulas (1) and (2), $R^4$ represents a hydrogen atom or a methyl group. In the above formula (1), Ar representing an aromatic ring skeleton has at least one aryl group and is a monovalent organic residue in which a carbon atom forming the aryl group is bonded to a group represented by $R^5$, and $R^5$ is a divalent organic residue having 1 to 4 carbon atoms. In the above formula (2), Ar representing an aromatic ring skeleton has at least one aryl group and is a monovalent organic residue in which a carbon atom forming the aryl group is bonded to —COO— in this formula.

In the above formula (1), as the group represented by $R^5$, a linear, a branched, or a cyclic substituted or unsubstituted alkylene group having 1 to 4 carbon atoms or a substituted or unsubstituted alkylene group having 1 to 4 carbon atoms and an oxygen atom derived from an ether bond and/or an ester bond in its structure is preferably mentioned. Among those mentioned above, an alkylene group, such as an ethylene group, an n-propylene group, an isopropylene group, or a butylene group, having 1 to 4 carbon atoms or an alkylene group, such as an oxyethylene group, an oxy-n-propylene group, an oxyisopropylene group, or an oxybutylene group, having 1 to 4 carbon atoms and an oxygen atom derived from an ether bond in its structure is preferably used. When the organic residue may be substituted by a substituent, although the substituent is not particularly limited, for example, a carboxy group, an alkoxy group, a hydroxy group, or a halo group may be mentioned, and when the substituent contains at least one carbon atom, the number of the carbon atoms thereof is included in the number of carbon atoms of the organic residue.

In the above formulas (1) and (2), although the at least one aryl group included in Ar (aryl) (aromatic ring skeleton) is not particularly limited, for example, a phenyl group or a naphthyl group may be mentioned. The number of aryl groups is one or more and preferably 1 or 2. The aryl group may be substituted at least one of the carbon atoms forming this aryl group other than the carbon atom bonded to the organic residue represented by $R^5$ in the formula (1), the carbon atom bonded to —COO— in the formula (2), and when at least two aryl groups are present, the carbon atom bonding two aryl groups thereof. When the aryl is substituted, the number of substituents per one aryl group is at least one and is preferably one or two. Although the substituent is not particularly limited, for example, a linear, a branched, or a cyclic alkyl group or alkoxy group having 1 to 10 carbon atoms, a carboxy group, a halo group, or a hydroxy group may be mentioned.

A content of the aromatic group-containing monofunctional monomer with respect to the total mass (100 percent by mass) of the polymerizable compounds is preferably 30 to 55 percent by mass, more preferably 35 to 50 percent by mass, and further preferably 40 to 45 percent by mass. Since the content of the aromatic group-containing monofunctional monomer with respect to the total mass of the polymerizable compounds is in the range described above, the abrasion resistance of the coating film tends to be further improved.

A content of the aromatic group-containing monofunctional monomer with respect to the total mass (100 percent by mass) of the composition is preferably 20 to 50 percent by mass, more preferably 25 to 45 percent by mass, and further preferably 30 to 40 percent by mass. Since the content of the aromatic group-containing monofunctional monomer with respect to the total mass of the composition is in the range described above, the abrasion resistance of the coating film tends to be further improved.

1.1.1.4. Saturated Aliphatic Group-Containing Monofunctional Monomer

Although the saturated aliphatic group-containing monofunctional monomer is not particularly limited, for example, there may be mentioned an alicyclic group-containing monofunctional monomer, such as tert-butylcyclohexanol acrylate (TBCHA) or 2-(meth)acrylic acid-1,4-dioxaspiro[4,5]deci-2-yl-methyl; a linear or a branched aliphatic group-containing monofunctional monomer, such as isoamyl (meth)acrylate, stearyl (meth)acrylate, lauryl (meth)acrylate, octyl (meth)acrylate, decyl (meth)acrylate, isodecyl (meth)acrylate, isomyristyl (meth)acrylate, isostearyl (meth)acrylate, 2-hydroxybutyl (meth)acrylate, butoxyethyl (meth)acrylate, tetrahydrofurfuryl (meth)acrylate, 2-hydroxyethyl (meth)acrylate, or 2-hydroxypropyl (meth)acrylate; or a lactone-modified flexible (meth)acrylate. Among those mentioned above, the alicyclic group-containing monofunctional monomer is preferable. When the saturated aliphatic group-containing monofunctional monomer as described above is used, the curing property of the composition tends to be further improved.

In addition, in this embodiment, the saturated aliphatic group-containing monofunctional monomer is regarded not to be included in the compound having a polycyclic hydrocarbon group.

A content of the saturated aliphatic group-containing monofunctional monomer with respect to the total mass (100 percent by mass) of the polymerizable compounds is preferably 1 to 20 percent by mass, more preferably 3 to 15 percent by mass, and further preferably 5 to 12 percent by mass. Since the content of the saturated aliphatic group-containing monofunctional monomer with respect to the total mass of the polymerizable compounds is 1 percent by mass or more, the flexibility and the adhesive property of the coating film tend to be further improved. In addition, since the content of the saturated aliphatic group-containing monofunctional monomer with respect to the total mass of the polymerizable compounds is 20 percent by mass or less, the abrasion resistance of the coating film tends to be further improved.

A content of the saturated aliphatic group-containing monofunctional monomer with respect to the total mass (100 percent by mass) of the composition is preferably 1 to 15 percent by mass, more preferably 3 to 12 percent by mass, and further preferably 5 to 10 percent by mass. Since the content of the saturated aliphatic group-containing monofunctional monomer with respect to the total mass of the composition is 1 percent by mass or more, the flexibility and the adhesive property of the coating film tend to be further improved. In addition, since the content of the saturated aliphatic group-containing monofunctional monomer with respect to the total mass of the composition is 15 percent by mass or less, the abrasion resistance of the coating film tends to be further improved.

1.1.1.5. Others

As monofunctional monomers other than those monomers mentioned above, for example, there may be used an unsaturated carboxylic acid, such as (meth)acrylic acid, itaconic acid, crotonic acid, isocrotonic acid, or maleic acid; a salt of one of the unsaturated carboxylic acids mentioned above; an ester, an urethane, an amide, or an anhydride of an unsaturated carboxylic acid; a vinyl compound, such as acrylonitrile or styrene; or an unsaturated polyester, an unsaturated polyether, an unsaturated polyamide, or an unsaturated urethane.

1.1.2. Polyfunctional Polymerizable Compound

The radiation curable ink jet composition according to this embodiment may also include a polyfunctional polymerizable compound (hereinafter, referred to as "polyfunctional monomer" in some cases). As the polyfunctional monomer, for example, a vinyl ether group-containing (meth)acrylate, a difunctional (meth)acrylate, or a polyfunctional (meth)acrylate having at least three functional groups may be mentioned. In addition, the polyfunctional monomer is not limited to those mentioned above.

A content of the polyfunctional monomer with respect to the total mass (100 percent by mass) of the polymerizable compounds is preferably 0.01 percent by mass or more, more preferably 0.5 percent by mass or more, and further preferably 1 percent by mass or more. Since the content of the polyfunctional monomer with respect to the total mass of the polymerizable compounds is 0.01 percent by mass or more, the abrasion resistance of the coating film tends to be further improved. In addition, since an upper limit of the content of the polyfunctional monomer with respect to the total mass (100 percent by mass) of the polymerizable compounds is preferably 20 percent by mass or less, more preferably 15 percent by mass or less, further preferably 10 percent by mass or less, and specifically preferably 7 percent by mass or less. Since the content of the polyfunctional monomer with respect to the total mass of the polymerizable compounds is 20 percent by mass or less, the flexibility and the adhesive property of the coating film tend to be further improved.

In addition, a content of the polyfunctional monomer with respect to the total mass (100 percent by mass) of the composition is preferably 0.3 percent by mass or more, more preferably 0.5 percent by mass or more, and further preferably 1 percent by mass or more. Since the content of the polyfunctional monomer with respect to the total mass of the composition is 0.3 percent by mass or more, the abrasion resistance of the coating film tends to be further improved. In addition, since an upper limit of the content of the polyfunctional monomer with respect to the total mass (100 percent by mass) of the composition is preferably 20 percent by mass or less, more preferably 15 percent by mass or less, further preferably 10 percent by mass or less, and specifically preferably 8 percent by mass or less. Since the content of the polyfunctional monomer with respect to the total mass of the composition is 20 percent by mass or less, the flexibility and the adhesive property of the coating film tend to be further improved.

Hereinafter, although the polyfunctional monomers will be described by way of example, the polyfunctional monomer according to this embodiment is not limited thereto.

1.1.2.1. Vinyl Ether Group-Containing (Meth)acrylate

Although the vinyl ether group-containing (meth)acrylate is not particularly limited, for example, a compound represented by the following formula (3) may be mentioned. Since the vinyl ether group-containing (meth)acrylate as described above is contained, the viscosity of the composition is decreased, and an ejection stability thereof tends to be further improved. In addition, the curing property of the composition is further improved, and in association with the improvement in curing property, a recording rate can be further increased.

$$CH_2=CR^1-COOR^2-O-CH=CH-R^3 \quad (3)$$

In the formula, $R^1$ represents a hydrogen atom or a methyl group, $R^2$ represents a divalent organic residue having 2 to 20 carbon atoms, and $R^3$ represents a monovalent organic residue having 1 to 11 carbon atoms.

In the above formula (3), as the divalent organic residue having 2 to 20 carbon atoms represented by $R^2$, for example, there may be mentioned a linear, a branched, or a cyclic substituted or unsubstituted alkylene group having 2 to 20 carbon atoms, a substituted or unsubstituted alkylene group having 2 to 20 carbon atoms and an oxygen atom derived from an ether bond and/or an ester bond in its structure, or a substituted or unsubstituted divalent aromatic group having 6 to 11 carbon atoms. Among those mentioned above, an alkylene group, such as an ethylene group, an n-propylene group, an isopropylene group, or a butylene group, having 2 to 6 carbon atoms or an alkylene group, such as an oxyethylene group, an oxy-n-propylene group, an oxyisopropylene group, or an oxybutylene group, having 2 to 9 carbon atoms and an oxygen atom derived from an ether bond in its structure is preferably used. Furthermore, in order to further decrease the viscosity of the composition and to further improve the curing property thereof, a compound having a glycol ether chain in which $R^2$ represents an alkylene group, such as an oxyethylene group, an oxy-n-propylene group, an oxyisopropylene group, or an oxybutylene group, having 2 to 9 carbon atoms and an oxygen atom derived from an ether bond in its structure is more preferable.

In the above formula (3), as the monovalent organic residue having 1 to 11 carbon atoms represented by $R^3$, a linear, a branched, or a cyclic substituted or unsubstituted alkyl group having 1 to 10 carbon atoms or a substituted or unsubstituted aromatic group having 6 to 11 carbon atoms is preferable. Among those mentioned above, an alkyl group, such as a methyl group or an ethyl group, having 1 to 2 carbon atoms or an aromatic group, such as a phenyl group or a benzyl group, having 6 to 8 carbon atoms is preferably used.

When the above organic residues are each a substituted group, the substituent thereof is classified into a group containing at least one carbon atom and a group containing no carbon atoms. First, when the substituent is a group containing at least one carbon atom, the number of carbon atoms thereof is included in the number of carbon atoms of the organic residue. Although the group containing at least one carbon atom is not particularly limited, for example, a carboxy group or an alkoxy group may be mentioned. Next, although the group containing no carbon atoms is not particularly limited, for example, there may be mentioned a hydroxy group or a halo group.

Although the compound of the formula (3) is not particularly limited, for example, there may be mentioned 2-vinyloxyethyl (meth)acrylate, 3-vinyloxypropyl (meth)acrylate, 1-methyl-2-vinyloxyethyl (meth)acrylate, 2-vinyloxypropyl (meth)acrylate, 4-vinyloxybutyl (meth)acrylate, 1-methyl-3-vinyloxypropyl (meth)acrylate, 1-vinyloxymethylpropyl (meth)acrylate, 2-methyl-3-vinyloxypropyl (meth)acrylate, 1,1-dimethyl-3-vinyloxyethyl (meth)acrylate, 3-vinyloxybutyl (meth)acrylate, 1-methyl-2-vinyloxypropyl (meth)acrylate, 2-vinyloxybutyl (meth)acrylate, 4-vinyloxycyclohexyl (meth)acrylate, 6-vinyloxyhexyl (meth)acrylate, 4-vinyloxymethylcyclohexylmethyl (meth)acrylate, 3-vinyloxymethylcyclohexylmethyl (meth)acrylate, 2-vinyloxymethylcyclohexylmethyl (meth)acrylate, p-vinyloxymethylphenylmethyl (meth)acrylate, m-vinyloxymethylphenylmethyl (meth)acrylate, o-vinyloxymethylphenylmethyl (meth)acrylate, 2-(2-vinyloxyethoxy)ethyl methacrylate, 2-(2-vinyloxyethoxy)ethyl acrylate, 2-(vinyloxyisopropoxy)ethyl (meth)acrylate, 2-(vinyloxyethoxy)propyl (meth)acrylate, 2-(vinyloxyethoxy)isopropyl (meth)acrylate, 2-(vinyloxyisopropoxy)propyl (meth)acrylate, 2-(vinyloxyisopropoxy)isopropyl (meth)acrylate, 2-(vinyloxyethoxyethoxy)ethyl (meth)acrylate, 2-(vinyloxyethoxyisopropoxy)ethyl (meth)acrylate, 2-(vinyloxyisopropoxyethoxy)ethyl (meth)acrylate, 2-(vinyloxyisopropoxyisopropoxy)ethyl (meth)acrylate, 2-(vinyloxyethoxyethoxy)propyl (meth)acrylate, 2-(vinyloxyethoxyisopropoxy)propyl (meth)acrylate, 2-(vinyloxyisopropoxyethoxy)propyl (meth)acrylate, 2-(vinyloxyisopropoxyisopropoxy)propyl (meth)acrylate, 2-(vinyloxyethoxyethoxy)isopropyl (meth)acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy)isopropyl (meth)acrylate, 2-(vinyloxyethoxyethoxyethoxy)ethyl (meth)acrylate, 2-(vinyloxyethoxyethoxyethoxyethoxy)ethyl (meth)acrylate, 2-(isopropenoxyethoxy)ethyl (meth)acrylate, 2-(isopropenoxyethoxyethoxy)ethyl (meth)acrylate, 2-(isopropenoxyethoxyethoxyethoxy)ethyl (meth)acrylate, 2-(isopropenoxyethoxyethoxyethoxyethoxy)ethyl (meth)acrylate, a polyethylene glycol monovinyl ether (meth)acrylate, or a polypropylene glycol monovinyl ether (meth)acrylate. Among those particular examples described above, since the balance between the curing property and the viscosity of the composition is likely to be obtained, 2-(2-vinyloxyethoxy)ethyl acrylate is particularly preferable. In addition, in this embodiment, 2-(2-vinyloxyethoxy)ethyl acrylate is called VEEA in some cases.

A content of the vinyl ether group-containing (meth)acrylate with respect to the total mass (100 percent by mass) of the polymerizable compounds is preferably 0.5 to 20 percent by mass, more preferably 0.75 to 15 percent by mass, and further preferably 1 to 10 percent by mass. Since the content of the vinyl ether group-containing (meth)acrylate with respect to the total mass of the polymerizable compounds is in the range described above, the viscosity of the composition is decreased, and the ejection stability thereof tends to be further improved.

A content of the vinyl ether group-containing (meth)acrylate with respect to the total mass (100 percent by mass) of the composition is preferably 0.5 to 20 percent by mass, more preferably 0.75 to 15 percent by mass, and further preferably 1 to 12 percent by mass. Since the content of the vinyl ether group-containing (meth)acrylate with respect to the total mass of the composition is in the range described above, the viscosity of the composition is decreased, and the ejection stability thereof tends to be further improved.

1.1.2.2. Difunctional (Meth)acrylate

Although the difunctional (meth)acrylate is not particularly limited, for example, there may be mentioned dipropylene glycol diacrylate (DPGDA), diethylene glycol di(meth)acrylate, triethylene glycol di(meth)acrylate, tetraethylene glycol di(meth)acrylate, a polyethylene glycol di(meth)acrylate, dipropylene glycol di(meth)acrylate, tripropylene glycol di(meth)acrylate, a polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol tricyclodecane di(meth)acrylate, di(meth)acrylate of an EO (ethylene oxide) adduct of bisphenol A, di(meth)acrylate of a PO (propylene oxide) adduct of bisphenol A, hydroxypivalic acid neopentyl glycol di(meth)acrylate, or a polytetramethylene glycol di(meth)acrylate.

1.1.2.3. Polyfunctional (Meth)acrylate Having at Least Three Functional Groups

Although the polyfunctional (meth)acrylate having at least three functional groups is not particularly limited, for example, there may be mentioned trimethylolpropane tri(meth)acrylate, an EO-modified trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerinpropoxy tri(meth)acrylate, caprolactone-modified trimethylolpropane tri(meth)acrylate, pentaerythritol ethoxy tetra(meth)acrylate, or caprolactam-modified dipentaerythritol hexa(meth)acrylate.

1.1.3. Glass Transition Temperature of Polymerizable Compound

In the radiation curable ink jet composition according to this embodiment, a weight average of glass transition temperatures of homopolymers derived from the respective polymerizable compounds obtained based on mass rates of the respective polymerizable compounds is preferably 42° C. or more, more preferably 44° C. or more, further preferably 46° C. or more, and specifically preferably 48° C. or more. When the weight average of the glass transition temperatures of the respective homopolymers is in the range described above, the abrasion resistance of the coating film at room temperature can be improved. In addition, although an upper limit of the weight average of the glass transition temperatures of the respective homopolymers is not particularly limited, the upper limit is preferably 60° C. or less, more preferably 55° C., and further preferably 50° C. or less.

A method for calculating the weight average of the glass transition temperatures will be described. A weight average value of the glass transition temperatures, a glass transition temperature of a homopolymer of an N-th polymerizable compound, and a mass rate of the N-th polymerizable compound are represented by $Tg_{All}$, $Tg_N$, and $X_N$ (percent by mass), respectively. In accordance with the types of polymerizable compounds contained in the radiation curable ink jet composition, N is sequentially designated by an integer from 1. For example, when three types of polymerizable compounds are used, they are sequentially designated by $Tg_1$, $Tg_2$, and $Tg_3$. The glass transition temperatures of the homopolymers derived from the respective polymerizable compounds may be obtained from the safety data sheets (SDS) of the polymerizable compounds and the catalogue transition temperatures is the sum of the products each obtained by multiplying the glass transition temperature $Tg_N$ of the homopolymer derived from the N-th polymerizable compound and the content $X_N$ thereof. Hence, the following equation (4) holds.

$$Tg_{All} = \Sigma Tg_N \times X_N \quad (4)$$

In addition, the weight average of the glass transition temperatures may be adjusted by the glass transition temperatures of the homopolymers derived from the respective polymerizable compounds to be used and the mass rates thereof.

1.2. Colorant

The radiation curable ink jet composition according to this embodiment contains, as the colorant, at least one (hereinafter, referred to as "specific pigment" in some cases) selected from the group consisting of C.I. Pigment Orange 36, C.I. Pigment Orange 38, C.I. Pigment Orange 43, C.I. Pigment Orange 64, C.I. Pigment Orange 71, C.I. Pigment Red 177, C.I. Pigment Red 179, C.I. Pigment Red 224, C.I. Pigment Red 254, C.I. Pigment Red 255, C.I. Pigment Violet 23, C.I. Pigment Violet 32, C.I. Pigment Violet 37, C.I. Pigment Violet 39, C.I. Pigment Green 7, C.I. Pigment Green 36, C.I. Pigment Blue 15:6, C.I. Pigment Blue 25 and C.I. Pigment Blue 60.

When the radiation curable ink jet composition according to this embodiment contains at least one type of the specific pigments described above as the colorant, the coverage of the color gamut can be increased.

In addition, among those specific pigments, C.I. Pigment Orange 43 or C.I. Pigment Red 254 is more preferably contained. In the case in which C.I. Pigment Orange 43 or C.I. Pigment Red 254 is contained as the colorant, when a cyan ink composition, a magenta ink composition, a yellow ink composition, and a black ink composition each of which will be described later are used in combination, the coverage of the color gamut can be further improved. In addition, when the colorant is irradiated with sunlight, the discoloration thereof can be prevented.

A lower limit of the content of the colorant with respect to the total mass (100 percent by mass) of the radiation curable ink jet composition is preferably 1 percent by mass or more and more preferably 2 percent by mass or more. In addition, an upper limit of the content of the colorant with respect to the total mass (100 percent by mass) of the radiation curable ink jet composition is preferably 20 percent by mass or less, more preferably 15 percent by mass or less, and further preferably 10 percent by mass or less. When the content of the colorant is in the range described above, the coverage of the color gamut tends to be further improved.

Dispersant

In order to further improve a pigment dispersibility, the radiation curable ink jet composition according to this embodiment preferably further contains a dispersant. The dispersant may be used alone, or at least two types thereof may be used in combination.

Although the dispersant is not particularly limited, for example, a dispersant, such as a polymer dispersant, generally used to prepare a pigment dispersion liquid may be mentioned. As a particular example thereof, for example, there may be mentioned a dispersant containing, as a primary component, at least one selected from the group consisting of a polyoxyalkylene polyalkylene polyamine, a vinyl-based polymer, a vinyl-based copolymer, an acrylic-based polymer, an acrylic-based copolymer, a polyester, a polyamide, a polyimide, a polyurethane, an amino-based polymer, a silicone-containing polymer, a sulfur-containing polymer, a fluorine-containing polymer, and an epoxy resin.

As a commercially available product of the polymer dispersant, for example, there may be mentioned Ajisper Series manufactured by Ajinomoto Fine-Techno Co., Inc.; Solsperse Series, such as Solsperse 36000, available from Avecia or Noveon; Disper BYK Series manufactured by BYK Additives & Instruments; or Disperlon Series manufactured by Kusumoto Chemicals, Ltd.

A content of the dispersant with respect to the total mass (100 percent by mass) of the composition is preferably 0.1 to 2 percent by mass, more preferably 0.1 to 1.5 percent by mass, and further preferably 0.5 to 1.0 percent by mass.

Other Colorants

The radiation curable ink jet composition according to this embodiment may also contain a colorant other than those specific pigments. As the other colorants, a pigment or a dye may be used.

As the pigment, an inorganic pigment and an organic pigment may both be used.

As the inorganic pigment, for example, a carbon black (C.I. (Colour Index Generic Name) Pigment Black 7), such as a furnace black, a lamp black, an acetylene black, or a channel black; iron oxide, or titanium oxide may be used.

As the organic pigment, for example, there may be mentioned an azo pigment, such as an insoluble azo pigment, a condensed azo pigment, an azo lake, or a chelate azo pigment; a polycyclic pigment, such as a phthalocyanine pigment, a perylene pigment, a perinone pigment, an anthraquinone pigment, a quinacridone pigment, a dioxane pigment, a thioindigo pigment, an isoindolinone pigment, or a quinophthalone pigment; a dye chelate, such as a basic dye chelate or an acidic dye chelate; a dye lake, such as a basic dye lake or an acidic dye lake; a nitro pigment, a nitroso pigment, an aniline black, or a daylight fluorescent pigment.

In more particular, as the carbon black which is a black-based pigment, for example, there may be mentioned No. 2300, No. 900, MCF88, No. 33, No. 40, No. 45, No. 52, MA7, MA8, MA100, or No. 2200B (manufactured by Mitsubishi Chemical Corporation); Raven 5750, Raven 5250, Raven 5000, Raven 3500, Raven 1255, or Raven 700 (manufactured by Carbon Columbia Co., Ltd.); Regal 400R, Regal 330R, or Regal 660R, Mogul L, Monarch 700, Monarch 800, Monarch 880, Monarch 900, Monarch 1000, Monarch 1100, Monarch 1300, or Monarch 1400 (manufactured by Cabot Japan K.K.); or Color Black FW1, Color Black FW2, Color Black FW2V, Color Black FW18, Color Black FW200, Color Black S150, Color Black 5160, or Color Black 5170, Printex 35, Printex U, Printex V, or Printex 140U, or Special Black 6, Special Black 5, Special Black 4A, or Special Black 4 (manufactured by Degussa).

As a white-based pigment, C.I. Pigment White 6, 18, or 21 may be mentioned.

As a yellow-based pigment, for example, there may be mentioned C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, or 180.

As a magenta-based pigment, for example, there may be mentioned C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 123, 144, 146, 149, 150, 166, 168, 170, 171, 175, 176, 178, 184, 185, 187, 202, 209, 219, or 245, or C.I. Pigment Violet 19, 33, 36, 38, 43, or 50.

As a cyan-based pigment, for example, there may be mentioned C.I. Pigment Blue 1, 2, 3, 15, 15:1, 15:2, 15:3, 15:34, 15:4, 16, 18, 22, 65, or 66 or C.I. Vat Blue 4 or 60.

As a pigment other than the magenta-based, cyan-based, and yellow-based pigments, for example, there may be mentioned C.I. Pigment Green 10, C.I. Pigment Brown 3, 5, 25, or 26, or C.I. Pigment Orange 1, 2, 5, 7, 13, 14, 15, 16, 24, 34, 40, or 63.

The pigment described above may be used alone, or at least two types thereof may be used in combination. In addition, when the above pigment is used, an average particle diameter thereof is preferably 300 nm or less and more preferably 50 to 200 nm. When the average particle diameter is in the range described above, the reliability, such as the ejection stability and dispersion stability, of the radiation curable ink jet composition can be further improved, and in addition, an image having an excellent image quality can be formed. In addition, the average particle diameter described in this specification is a value of $D_{v50}$ measured by a dynamic light scattering method.

In addition, the dye is not particularly limited, and for example, an acidic dye, a direct dye, a reactive dye, or a basic dye may be used. As the dye, for example, there may be mentioned C.I. Acid Yellow 17, 23, 42, 44, 79, or 142, C.I. Acid Red 52, 80, 82, 249, 254, or 289, C.I. Acid Blue 9, 45, or 249, C.I. Acid Black 1, 2, 24, or 94, C.I. Food Black 1 or 2, C.I. Direct Yellow 1, 12, 24, 33, 50, 55, 58, 86, 132, 142, 144, or 173, C.I. Direct Red 1, 4, 9, 80, 81, 225, or 227, C.I. Direct Blue 1, 2, 15, 71, 86, 87, 98, 165, 199, or 202, C.I. Direct Black 19, 38, 51, 71, 154, 168, 171, or 195, C.I. Reactive Red 14, 32, 55, 79, or 249, or C.I. Reactive Black 3, 4, or 35.

The dye may be used alone, or at least two types thereof may be used in combination.

1.3. Other Components

The radiation curable ink jet composition according to this embodiment may also contain a polymerization initiator, a polymerization inhibitor, a slipping agent, and/or the like.

Polymerization Initiator

The radiation curable ink jet composition according to this embodiment preferably contains a polymerization initiator which generates active species when being irradiated with radioactive rays. The polymerization initiator may be used alone, or at least two types thereof may be used in combination.

Although the polymerization initiator is not particularly limited, for example, there may be mentioned a known polymerization initiator, such as an acylphosphine oxide-based polymerization initiator, an alkylphenone-based polymerization initiator, a titanocene-based polymerization initiator, or a thioxanthone-based polymerization initiator. Among those mentioned above, the acylphosphine oxide-based polymerization initiator is preferable. Since the polymerization initiator as described above is used, the curing property of the composition is further improved, and in particular, the curing property in a curing process using light emitted from an ultraviolet light-emitting diode (UV-LED) tends to be further improved.

Although the acylphosphine oxide-based polymerization initiator is not particularly limited, for example, there may be mentioned 2,4,6-trimethylbenzoyl diphenylphosphine oxide, bis(2,4,6-trimethylbenzoyl)-phenylphosphine oxide, or bis(2,6-dimethoxybenzoyl)-2,4,4-trimethylpentylphosphine oxide.

As a commercially available product of the acylphosphine oxide-based polymerization initiator described above, for example, there may be mentioned IRGACURE 819 (bis(2,4,6-trimethylbenzoyl)-phenylphosphine oxide), IRGACURE 1800 (mixture of bis(2,6-diimethoxybenzoyl)-2,4,4-trimethylpentylphosphine oxide and 1-hydroxy-cyclohexyl-phenyl ketone at a mass ratio of 25:75), or IRGACURE TPO (2,4,6-trimethylbenzoyl)-diphenylphosphine oxide) (each manufactured by BASF).

A content of the polymerization initiator with respect to the total mass (100 percent by mass) of the composition is preferably 1 to 20 percent by mass, more preferably 3 to 15 percent by mass, further preferably 5 to 10 percent by mass, and specifically preferably 7 to 9 percent by mass. Since the content of the photopolymerization initiator is in the range described above, the curing property of the composition and the solubility of the polymerization initiator tend to be further improved.

Polymerization Inhibitor

The radiation curable ink jet composition according to this embodiment may further contain a polymerization inhibitor. The polymerization inhibitor may be used alone, or at least two types thereof may be used in combination.

Although the polymerization inhibitor is not particularly limited, for example, there may be mentioned p-methoxyphenol, hydroquinone monomethyl ether (MEHQ), 4-hydroxy-2,2,6,6-tetramethypyperidine-N-oxyl, hydroquinone, cresol, t-butylcatechol, 3,5-di-t-butyl-4-hydroxytoluene, 2,2'-methylenebis(4-methyl-6-t-butylphenol), 2,2'-methylenebis(4-ethyl-6-butylphenol), 4,4'-thiobis(3-methyl-6-t-butylphenol), or a hindered amine compound.

A content of the polymerization inhibitor with respect to the total mass (100 percent by mass) of the composition is preferably 0.05 to 1 percent by mass and more preferably 0.05 to 0.5 percent by mass.

Slipping Agent

The radiation curable ink jet composition according to this embodiment may further contain a slipping agent. The slipping agent may be used alone, or at least two types thereof may be used in combination.

As the slipping agent, a silicone-based surfactant is preferable, and a polyester-modified silicone or a polyether-modified silicone is more preferable. As the polyether-modified silicone, for example, BYK-378 or 3455 or BYK-UV3500, 3510, or 3530 (each manufactured by BYK Additives & Instruments) may be mentioned. As the polyester-modified silicone, for example, BYk-3570 (manufactured by BYK Additives & Instruments) may be mentioned.

A content of the slipping agent with respect to the total mass (100 percent by mass) of the composition is preferably 0.01 to 2 percent by mass and more preferably 0.05 to 1 percent by mass.

In addition, the radiation curable ink jet composition according to this embodiment may further contain a photosensitizer.

1.4. Physical Property

A viscosity of the radiation curable ink jet composition according to this embodiment at 20° C. is preferably 25 mPa·s or less and more preferably 5 mPa·s to 25 mPa·s. Since the viscosity of the composition at 20° C. is in the range described above, an appropriate amount of the composition is ejected from a nozzle, and flight curving and scattering of ink liquid droplets can be further suppressed; hence, the radiation curable ink jet composition described above can be preferably applied to an ink jet recording apparatus. In addition, the viscosity may be measured using a viscoelastic measurement device, MCR-300, manufactured by Pysica such that while a shear rate is increased from 10 to 1,000 in an environment at 20° C., a viscosity at a shear rate of 200 is read.

A surface tension of the radiation curable ink jet composition according to this embodiment at 20° C. is preferably 20 mN/m to 40 mN/m. Since the surface tension of the radiation curable ink jet composition at 20° C. is in the range described above, the composition becomes unlikely to wet a nozzle surface processed by a liquid repellent treatment. Accordingly, an appropriate amount of the composition is normally ejected from the nozzle, and the flight curving and the scattering of the composition can be further suppressed; hence, the radiation curable ink jet composition described above can be preferably applied to the ink jet recording apparatus. In addition, the surface tension may be measured using an automatic surface tension meter, CBVP-Z, manufactured by Kyowa Interface Science Co., Ltd. such that when a platinum plate is wetted with the radiation curable ink jet composition in an environment at 20° C., the surface tension thereof is confirmed.

1.5. Method for Manufacturing Composition

A method for manufacturing (preparing) the radiation curable ink jet composition is performed such that the components contained in the composition are stirred so as to be uniformly mixed together. In this embodiment, the preparation of the radiation curable ink jet composition preferably has, in a preparation process, a step in which at least one of an ultrasonic treatment and a heating treatment is performed on a mixture in which at least some or parts of the polymerizable compounds are mixed with the photopolymerization initiator. Accordingly, a dissolved oxygen amount in the composition thus prepared can be decreased, and hence, a radiation curable ink jet composition excellent in ejection stability and/or storage stability can be obtained. The mixture described above may contain at least the components described above, may further contain the other components of the radiation curable ink jet composition, or may contain all the components thereof. The polymerizable compounds contained in the mixture may be at least some or parts of the polymerizable compounds of the radiation curable ink jet composition.

2. Ink Set

An ink set according to one embodiment of the present disclosure includes a cyan ink composition, a magenta ink composition, a yellow ink composition, a black ink composition, and the radiation curable ink jet composition described above.

Even if an image in which the coverage of the color gamut is increased is formed by using an ink set including a specific color ink which contains a specific pigment as the colorant, when the printed matter thus obtained is installed outside, cracks are liable to be generated in a printed coating film. On the contrary, when an image is formed without using an ink set in which a specific color ink containing a specific pigment as the colorant is used, the coverage of the color gamut cannot be increased. However, according to the ink set of this embodiment, since at least one specific pigment is contained as the colorant in the radiation curable ink jet composition which forms the ink set, the coverage of the color gamut can be increased, and in addition, since the monofunctional polymerizable compound is contained in a predetermined amount or more with respect to the total mass (100 percent by mass) of the polymerizable compounds, the stretching property of the coating film is improved, and the printed coating film can be prevented from being cracked (coating film cracking) when being installed outside. That is, according to the ink set of this embodiment, the coverage of the color gamut can be increased, and in addition, an ink set capable of protecting the color gamut thus expanded can be provided.

Hereinafter, the cyan ink composition, the magenta ink composition, the yellow ink composition, and the black ink composition, each of which is contained in the ink set of this embodiment, will be described. In addition, since the radiation curable ink jet composition contained in the ink set according to this embodiment is the same as that described above, the description thereof will be omitted.

2.1. Cyan Ink Composition

The ink set of this embodiment contains the cyan ink composition. Hereinafter, components to be contained in the cyan ink composition will be described.

2.1.1. Colorant

The cyan ink composition contained in the ink set according to this embodiment preferably contains a colorant. Although the colorant to be used for the cyan ink composition is not particularly limited, for example, there may be mentioned C.I. Pigment Blue 1, 2, 3, 15, 15:1, 15:2, 15:3, 15:34, 15:4, 16, 18, 22, 25, 60, 65, or 66 or C.I. Vat Blue 4 or 60.

Other Colorants

The cyan ink composition contained in the ink set according to this embodiment may contain at least one colorant other than those mentioned above. As the colorant described above, either a pigment or a dye may be used.

As the pigment, either an inorganic pigment or an organic pigment may be used.

As the inorganic pigment, a carbon black (C.I. (Colour Index Generic Name) Pigment Black 7), such as a furnace black, a lamp black, an acetylene black, or a channel black; iron oxide, or titanium oxide may be used.

As the organic pigment, for example, there may be mentioned an azo pigment, such as an insoluble azo pigment, a condensed azo pigment, an azo lake, or a chelate azo pigment; a polycyclic pigment, such as a phthalocyanine pigment, a perylene pigment, a perinone pigment, an anthraquinone pigment, a quinacridone pigment, a dioxane pigment, a thioindigo pigment, an isoindolinone pigment, or a quinophthalone pigment; a dye chelate, such as a basic dye chelate or an acidic dye chelate; a dye lake, such as a basic dye lake or an acidic dye lake; a nitro pigment, a nitroso pigment, an aniline black, or a daylight fluorescent pigment.

In more particular, as the carbon black which is a black-based pigment, for example, there may be mentioned No. 2300, No. 900, MCF88, No. 33, No. 40, No. 45, No. 52, MA7, MA8, MA100, or No. 2200B (manufactured by Mitsubishi Chemical Corporation); Raven 5750, Raven 5250, Raven 5000, Raven 3500, Raven 1255, or Raven 700 (manufactured by Carbon Columbia Co., Ltd.); Regal 400R, Regal 330R, or Regal 660R, Mogul L, Monarch 700, Monarch 800, Monarch 880, Monarch 900, Monarch 1000, Monarch 1100, Monarch 1300, or Monarch 1400 (manufactured by Cabot Japan K.K.); or Color Black FW1, Color Black FW2, Color Black FW2V, Color Black FW18, Color Black FW200, Color Black S150, Color Black 5160, or Color Black 5170, Printex 35, Printex U, Printex V, or Printex 140U, or Special Black 6, Special Black 5, Special Black 4A, or Special Black 4 (manufactured by Degussa).

As the white-based pigment, C.I. Pigment White 6, 18, or 21 may be mentioned.

As the yellow-based pigment, for example, there may be mentioned C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, or 180.

As the magenta-based pigment, for example, there may be mentioned C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, or 245, or C.I. Pigment Violet 19, 23, 32, 33, 36, 38, 43, or 50.

As a pigment other than the magenta-based, the cyan-based, and the yellow-based pigments, for example, there may be mentioned C.I. Pigment Green 7 or 10, C.I. Pigment Brown 3, 5, 25, or 26, or C.I. Pigment Orange 1, 2, 5, 7, 13, 14, 15, 16, 24, 34, 36, 38, 40, 43, or 63.

The pigment described above may be used alone, or at least two types thereof may be used in combination. In addition, when the above pigment is used, the average particle diameter thereof is preferably 300 nm or less and more preferably 50 to 200 nm. When the average particle diameter of the pigment is in the range described above, the reliability, such as the ejection stability and dispersion stability, of the cyan ink composition can be further improved, and in addition, an image having an excellent image quality can be formed.

The dye is not particularly limited, and for example, an acidic dye, a direct dye, a reactive dye, or a basic dye may be used. As the dye, for example, there may be mentioned C.I. Acid Yellow 17, 23, 42, 44, 79, or 142, C.I. Acid Red 52, 80, 82, 249, 254, or 289, C.I. Acid Blue 9, 45, or 249, C.I. Acid Black 1, 2, 24, or 94, C.I. Food Black 1 or 2, C.I. Direct Yellow 1, 12, 24, 33, 50, 55, 58, 86, 132, 142, 144, or 173, C.I. Direct Red 1, 4, 9, 80, 81, 225, or 227, C.I. Direct Blue 1, 2, 15, 71, 86, 87, 98, 165, 199, or 202, C.I. Direct Black 19, 38, 51, 71, 154, 168, 171, or 195, C.I. Reactive Red 14, 32, 55, 79, or 249, or C.I. Reactive Black 3, 4, or 35.

The dye may be used alone, or at least two types thereof may be used in combination.

A lower limit of the content of the colorant with respect to the total mass (100 percent by mass) of the cyan ink composition is preferably 1 percent by mass or more and more preferably 2 percent by mass or more. In addition, an upper limit of the content of the colorant with respect to the total mass (100 percent by mass) of the cyan ink composition is preferably 20 percent by mass or less, more preferably 15 percent by mass or less, and further preferably 10 percent by mass or less. Since the content of the colorant is in the range described above, the coverage of the color gamut may be further improved in some cases.

2.1.2. Other Components

Since the components other than the colorant to be contained in the cyan ink composition contained in the ink set according to this embodiment are similar to those of the radiation curable ink jet composition described above, the description thereof will be omitted.

2.2. Magenta Ink Composition

The ink set according to this embodiment contains the magenta ink composition. Hereafter, components to be contained in the magenta ink composition will be described.

2.2.1. Colorant

The magenta ink composition contained in the ink set according to this embodiment preferably contains a colorant. Although the colorant used in the magenta ink composition is not particularly limited, for example, there may be mentioned C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, or 245, or C.I. Pigment Violet 19, 23, 32, 33, 36, 38, 43, or 50.

The magenta ink composition contained in the ink set according to this embodiment may contain, as a colorant other than those colorants mentioned above, the colorant which may be contained in the cyan ink composition described above, and for example, a content thereof is similar to that described above; hence, the description thereof will be omitted.

2.2.2. Other Components

Since the components other than the colorant to be contained in the magenta ink composition contained in the ink set according to this embodiment are similar to those of the radiation curable ink jet composition described above, the description thereof will be omitted.

2.3. Yellow Ink Composition

The ink set according to this embodiment contains the yellow ink composition. Hereafter, components to be contained in the yellow ink composition will be described.

2.3.1. Colorant

The yellow ink composition contained in the ink set according to this embodiment preferably contains a colorant. Although the colorant used in the yellow ink composition is not particularly limited, for example, there may be mentioned C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, or 180.

The yellow ink composition contained in the ink set according to this embodiment may contain, as a colorant other than those colorants mentioned above, the colorant which may be contained in the cyan ink composition described above, and for example, a content thereof is similar to that described above; hence, the description thereof will be omitted.

2.3.2. Other Components

Since the components other than the colorant to be contained in the yellow ink composition contained in the ink set according to this embodiment are similar to those of the radiation curable ink jet composition described above, the description thereof will be omitted.

2.4. Black Ink Composition

The ink set according to this embodiment contains the black ink composition. Hereafter, components to be contained in the black ink composition will be described.

2.4.1. Colorant

The black ink composition contained in the ink set according to this embodiment preferably contains a colorant. Although the colorant used in the black ink composition is not particularly limited, for example, there may be used a carbon black (C.I. Pigment Black 7), such as a furnace black, a lamp black, an acetylene black, or a channel black. In more particular, as the carbon black to be used for black, for example, there may be mentioned No. 2300, No. 900, MCF88, No. 33, No. 40, No. 45, No. 52, MA7, MA8, MA100, or No. 2200B (manufactured by Mitsubishi Chemical Corporation); Raven 5750, Raven 5250, Raven 5000, Raven 3500, Raven 1255, or Raven 700 (manufactured by Carbon Columbia Co., Ltd.); Regal 400R, Regal 330R, or Regal 660R, Mogul L, Monarch 700, Monarch 800, Monarch 880, Monarch 900, Monarch 1000, Monarch 1100, Monarch 1300, or Monarch 1400 (manufactured by Cabot Japan K.K.); or Color Black FW1, Color Black FW2, Color Black FW2V, Color Black FW18, Color Black FW200, Color Black 5150, Color Black S160, or Color Black 5170, Printex 35, Printex U, Printex V, or Printex 140U, or Special Black 6, Special Black 5, Special Black 4A, or Special Black 4 (manufactured by Degussa).

The black ink composition contained in the ink set according to this embodiment may contain, as a colorant other than those colorants mentioned above, the colorant which may be contained in the cyan ink composition described above, and for example, a content thereof is similar to that described above; hence, the description thereof will be omitted.

2.4.2. Other Components

Since the components other than the colorant to be contained in the black ink composition contained in the ink set according to this embodiment are similar to those of the radiation curable ink jet composition described above, the description thereof will be omitted.

3. Examples

Hereinafter, although the present disclosure will be described in more detail with reference to Examples, the present disclosure is not limited thereto. Hereinafter, "%" is based on a mass basis unless otherwise particularly noted.

3.1. Preparation of Ink Jet Composition

First, after a colorant, a dispersant, and some or parts of monomers were weighed and then charged in a pigment dispersing tank, the mixture thus prepared was stirred with ceramic-made beads each having a diameter of 1 mm, so that a pigment dispersion liquid in which the colorant was dispersed in the polymerizable compounds was obtained. Subsequently, in order to obtain one of the compositions shown in the following Tables 1 to 3, after the remaining monomers, a polymerization initiator, a polymerization inhibitor, and a slipping agent were charged in a stainless steel-made mixture container and were then fully dissolved by mixing and stirring, the pigment dispersion liquid obtained as described above was charged. The mixture thus prepared was further mixed and stirred at ordinary temperature for one hour and was then filtrated using a 5-μm membrane filter, so that an ink jet composition of each Example was obtained.

In addition, the numerical value of each component of each of Examples shown in the following Tables 1 to 3 represents percent by mass, that is, a mass rate of the each component. In addition, "vinyl compound" in the following Tables 1 to 3 represents an N-vinyl compound, and a compound marked with "o" is the vinyl compound. In addition, in the following Table 3, "Cy" represents a cyan ink composition, "Ma" represents a magenta ink composition, "Ye" represents a yellow ink composition, "Bk" represents a black ink composition, and "CMYK composition" represents a cyan ink composition, a magenta ink composition, a yellow ink composition, and a black ink composition.

In addition, "Tg (° C.) of monomer" in the following Tables 1 to 3 represents a value used to calculate a weight average of glass transition temperatures of homopolymers derived from the monomers contained in each Example.

TABLE 1

|  |  |  | Vinyl compound | Tg (° C.) | Example |  |  |  |  |  |  |  |  |  |  |
|---|---|---|---|---|---|---|---|---|---|---|---|---|---|---|---|
|  |  |  |  |  | 1 | 2 | 3 | 4 | 5 | 6 | 7 | 8 | 9 | 10 | 11 |
| Monomer | Mono-function | NVC | o | 90 |  |  |  | 2 |  |  |  |  |  |  |  |
|  |  | VMOX | o | 145 |  |  |  |  | 2 |  |  |  |  |  |  |
|  |  | THEA |  | −12 |  |  |  |  |  | 2.0 |  |  |  |  |  |

TABLE 1-continued

| | | | | | | | | | | | | | | |
|---|---|---|---|---|---|---|---|---|---|---|---|---|---|---|
| | | DCPA | 110 | | | 2.0 | | | | | | | | |
| | | IBXA | 94 | 27.0 | 27.0 | 27.0 | 27.0 | 27.0 | 27.0 | 27.0 | 27.0 | 27.0 | 27.0 | 27.0 |
| | | PEA | −22 | 33.3 | 26.3 | 40.3 | 40.3 | 30.3 | 31.3 | 33.3 | 33.3 | 33.3 | 33.3 | 33.3 |
| | | ACMO | 145 | 15.0 | 15.0 | 15.0 | 15.0 | 15.0 | 15.0 | 15.0 | 15.0 | 15.0 | 15.0 | 15.0 |
| | | BZA | 6 | | | | | 10.0 | | | | | | |
| | Poly- | VEEA | 39 | 12.0 | 19.0 | 3.0 | 3.0 | 3.0 | 6.0 | 12.0 | 12.0 | 12.0 | 12.0 | 12.0 |
| | function | DPGDA | 104 | | | | | | 6.0 | | | | | |
| Polymerization | | 819 | | 2.5 | 2.5 | 2.5 | 2.5 | 2.5 | 2.5 | 2.5 | 2.5 | 2.5 | 2.5 | 2.5 |
| initiator | | TPO | | 5.5 | 5.5 | 5.5 | 5.5 | 5.5 | 5.5 | 5.5 | 5.5 | 5.5 | 5.5 | 5.5 |
| Polymerization inhibitor | | MEHQ | | 0.2 | 0.2 | 0.2 | 0.2 | 0.2 | 0.2 | 0.2 | 0.2 | 0.2 | 0.2 | 0.2 |
| Slipping agent | | BYK UV3500 | | 0.5 | 0.5 | 0.5 | 0.5 | 0.5 | 0.5 | 0.5 | 0.5 | 0.5 | 0.5 | 0.5 |
| Colorant | | P.O.36 | | | | | | | | 3.0 | | | | |
| | | P.O.38 | | | | | | | | | 3.0 | | | |
| | | P.O.43 | | 3.0 | 3.0 | 3.0 | 3.0 | 3.0 | 3.0 | | | | | |
| | | P.O.64 | | | | | | | | | | 3.0 | | |
| | | P.O.71 | | | | | | | | | | | 3.0 | |
| | | P.O.13 | | | | | | | | | | | | |
| | | P.R.177 | | | | | | | | | | | | 3.0 |
| | | P.R.179 | | | | | | | | | | | | |
| | | P.R.224 | | | | | | | | | | | | |
| | | P.R.254 | | | | | | | | | | | | |
| | | P.R.255 | | | | | | | | | | | | |
| | | P.R.175 | | | | | | | | | | | | |
| | | P.V.23 | | | | | | | | | | | | |
| | | P.V.32 | | | | | | | | | | | | |
| | | P.V.37 | | | | | | | | | | | | |
| | | P.V.39 | | | | | | | | | | | | |
| | | P.G.7 | | | | | | | | | | | | |
| | | P.G.36 | | | | | | | | | | | | |
| | | P.B.15:6 | | | | | | | | | | | | |
| | | P.B.25 | | | | | | | | | | | | |
| | | P.B.60 | | | | | | | | | | | | |
| | | P.B.15:3 | | | | | | | | | | | | |
| | | P.R.122 | | | | | | | | | | | | |
| | | P.Y.155 | | | | | | | | | | | | |
| | | Carbon black | | | | | | | | | | | | |
| Dispersant | | Solsperse36000 | | 1.0 | 1.0 | 1.0 | 1.0 | 1.0 | 1.0 | 1.0 | 1.0 | 1.0 | 1.0 | 1.0 |
| | | Total | | 100 | 100 | 100 | 100 | 100 | 100 | 100 | 100 | 100 | 100 | 100 |
| Physical property | | Monofunctional monomer rate in polymerizable compounds | 78 or more | 86 | 78 | 97 | 97 | 97 | 86 | 86 | 86 | 86 | 86 | 86 |
| | | Tg of monomer (° C.) | 48° C. or more | 51 | 56 | 48 | 47 | 58 | 56 | 51 | 51 | 51 | 51 | 51 |
| | | N-vinyl compound rate in polymerizable compounds | 5% or less | 0 | 0 | 2 | 2 | 0 | 0 | 0 | 0 | 0 | 0 | 0 |

| | | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| Evaluation of coating film | Color weather resistance | A | A | A | A | A | A | C | C | C | B | A |
| | Coating film cracking | A | A | A | A | A | A | A | A | A | A | A |
| | Smoothness | A | A | A | B | B | A | A | A | A | A | A |
| | Improvement in coverage of color gamut | A | A | A | A | A | A | C | B | B | B | B |
| | Stretching property | B | C | A | A | A | B | B | B | B | B | B |
| | Abrasion resistance | B | A | C | C | B | B | B | B | B | B | B |

TABLE 2

| | | Vinyl compound | Tg (° C.) | Example | | | | | | | | | | |
|---|---|---|---|---|---|---|---|---|---|---|---|---|---|---|
| | | | | 12 | 13 | 14 | 15 | 16 | 17 | 18 | 19 | 20 | 21 | 22 |
| Monomer | Mono- | NVC | O | 90 | | | | | | | | | | | |
| | function | VMOX | O | 145 | | | | | | | | | | | |
| | | THEA | | −12 | | | | | | | | | | | |
| | | DCPA | | 110 | | | | | | | | | | | |
| | | IBXA | | 94 | 27.0 | 27.0 | 27.0 | 27.0 | 27.0 | 27.0 | 27.0 | 27.0 | 27.0 | 27.0 | 27.0 |
| | | PEA | | −22 | 33.3 | 33.3 | 33.3 | 33.3 | 33.3 | 33.3 | 33.3 | 33.3 | 33.3 | 33.3 | 33.3 |
| | | ACMO | | 145 | 15.0 | 15.0 | 15.0 | 15.0 | 15.0 | 15.0 | 15.0 | 15.0 | 15.0 | 15.0 | 15.0 |
| | | BZA | | 6 | | | | | | | | | | | |

TABLE 2-continued

| | | | | | | | | | | | | | | |
|---|---|---|---|---|---|---|---|---|---|---|---|---|---|---|
| | Poly-function | VEEA | 39 | 12.0 | 12.0 | 12.0 | 12.0 | 12.0 | 12.0 | 12.0 | 12.0 | 12.0 | 12.0 | 12.0 |
| | | DPGDA | 104 | | | | | | | | | | | |
| Polymerization initiator | | 819 | | 2.5 | 2.5 | 2.5 | 2.5 | 2.5 | 2.5 | 2.5 | 2.5 | 2.5 | 2.5 | 2.5 |
| | | TPO | | 5.5 | 5.5 | 5.5 | 5.5 | 5.5 | 5.5 | 5.5 | 5.5 | 5.5 | 5.5 | 5.5 |
| Polymerization inhibitor | | MEHQ | | 0.2 | 0.2 | 0.2 | 0.2 | 0.2 | 0.2 | 0.2 | 0.2 | 0.2 | 0.2 | 0.2 |
| Slipping agent | | BYK UV3500 | | 0.5 | 0.5 | 0.5 | 0.5 | 0.5 | 0.5 | 0.5 | 0.5 | 0.5 | 0.5 | 0.5 |
| Colorant | | P.O.36 | | | | | | | | | | | | |
| | | P.O.38 | | | | | | | | | | | | |
| | | P.O.43 | | | | | | | | | | | | |
| | | P.O.64 | | | | | | | | | | | | |
| | | P.O.71 | | | | | | | | | | | | |
| | | P.O.13 | | | | | | | | | | | | |
| | | P.R.177 | | | | | | | | | | | | |
| | | P.R.179 | | 3.0 | | | | | | | | | | |
| | | P.R.224 | | | 3.0 | | | | | | | | | |
| | | P.R.254 | | | | 3.0 | | | | | | | | |
| | | P.R.255 | | | | | 3.0 | | | | | | | |
| | | P.R.175 | | | | | | | | | | | | |
| | | P.V.23 | | | | | | 3.0 | | | | | | |
| | | P.V.32 | | | | | | | 3.0 | | | | | |
| | | P.V.37 | | | | | | | | 3.0 | | | | |
| | | P.V.39 | | | | | | | | | 3.0 | | | |
| | | P.G.7 | | | | | | | | | | 3.0 | | |
| | | P.G.36 | | | | | | | | | | | 3.0 | |
| | | P.B.15:6 | | | | | | | | | | | | 3.0 |
| | | P.B.25 | | | | | | | | | | | | |
| | | P.B.60 | | | | | | | | | | | | |
| | | P.B.15:3 | | | | | | | | | | | | |
| | | P.R.122 | | | | | | | | | | | | |
| | | P.Y.155 | | | | | | | | | | | | |
| | | Carbon black | | | | | | | | | | | | |
| Dispersant | | Solsprese36000 | | 1.0 | 1.0 | 1.0 | 1.0 | 1.0 | 1.0 | 1.0 | 1.0 | 1.0 | 1.0 | 1.0 |
| | Total | | | 100 | 100 | 100 | 100 | 100 | 100 | 100 | 100 | 100 | 100 | 100 |
| Physical property | Monofunctional monomer rate in polymerizable compounds | | 78 or more | 86 | 86 | 86 | 86 | 86 | 86 | 86 | 86 | 86 | 86 | 86 |
| | Tg of monomer (° C.) | | 48° C. or more | 51 | 51 | 51 | 51 | 51 | 51 | 51 | 51 | 51 | 51 | 51 |
| | N-vinyl compound rate in polymerizable compounds | | 5% or less | 0 | 0 | 0 | 0 | 0 | 0 | 0 | 0 | 0 | 0 | 0 |

| | | Example 12 | Example 13 | Example 14 | Example 15 | Example 16 | Example 17 | Example 18 | Example 19 | Example 20 | Example 21 | Example 22 |
|---|---|---|---|---|---|---|---|---|---|---|---|---|
| Evaluation of coating film | Color weather resistance | A | B | A | A | B | C | B | B | A | A | B |
| | Coating film cracking | A | A | A | A | A | A | A | A | A | A | A |
| | Smoothness | A | A | A | A | A | A | A | A | A | A | A |
| | Improvement in coverage of color gamut | B | B | A | B | A | B | B | B | B | B | B |
| | Stretching property | B | B | B | B | B | B | B | B | B | B | B |
| | Abrasion resistance | B | B | B | B | B | B | B | B | B | B | B |

TABLE 3

| | | | Vinyl compound | Tg (° C.) | Example 23 | Example 24 | Example 25 | Comparative example 1 | Comparative example 2 | Comparative example 3 | Cmyk composition Cy | Ma | Ye | Bk |
|---|---|---|---|---|---|---|---|---|---|---|---|---|---|---|
| Monomer | Mono-function | NVC | O | 90 | | | | 6 | | | | | | |
| | | VMOX | O | 145 | | | | | | | | | | |
| | | THEA | | −12 | | | | | | | | | | |
| | | DCPA | | 110 | | | | | | | | | | |
| | | IBXA | | 94 | 27.0 | 27.0 | 27.0 | 27.0 | 27.0 | 27.0 | 27.0 | 27.0 | 27.0 | 27.0 |
| | | PEA | | −22 | 33.3 | 33.3 | 36.3 | 24.3 | 33.3 | 33.3 | 33.3 | 33.3 | 33.3 | 33.3 |
| | | ACMO | | 15.0 | 145 | 15.0 | 15.0 | 15.0 | 15.0 | 15.0 | 15.0 | 15.0 | 15.0 | 15.0 |
| | | BZA | | 6 | | | | | | | | | | |
| | Poly-function | VEEA | | 39 | 12.0 | 12.0 | 3.0 | 21.0 | 12.0 | 12.0 | 12.0 | 12.0 | 12.0 | 12.0 |
| | | DPGDA | | 104 | | | | | | | | | | |
| Polymerization initiator | | 819 | | | 2.5 | 2.5 | 2.5 | 2.5 | 2.5 | 2.5 | 2.5 | 2.5 | 2.5 | |
| | | TPO | | | 5.5 | 5.5 | 5.5 | | | | | | | |

TABLE 3-continued

| | | | | | | | | | | | | |
|---|---|---|---|---|---|---|---|---|---|---|---|---|
| Polymerization inhibitor | MEHQ | | 0.2 | 0.2 | 0.2 | 0.2 | 2.5 | 0.2 | 0.2 | 0.2 | 0.2 | 0.2 |
| Slipping agent | BYK UV3500 | | 0.5 | 0.5 | 0.5 | 0.5 | 0.5 | 0.5 | 0.5 | 0.5 | 0.5 | 0.5 |
| Colorant | P.O.36 | | | | | | | | | | | |
| | P.O.38 | | | | | | | | | | | |
| | P.O.43 | | | | 3.0 | 3.0 | | | | | | |
| | P.O.64 | | | | | | | | | | | |
| | P.O.71 | | | | | | | | | | | |
| | P.O.13 | | | | | | 3.0 | | | | | |
| | P.R.177 | | | | | | | | | | | |
| | P.R.179 | | | | | | | | | | | |
| | P.R.224 | | | | | | | | | | | |
| | P.R.254 | | | | | | | | | | | |
| | P.R.255 | | | | | | | | | | | |
| | P.R.175 | | | | | | | 3.0 | | | | |
| | P.V.23 | | | | | | | | | | | |
| | P.V.32 | | | | | | | | | | | |
| | P.V.37 | | | | | | | | | | | |
| | P.V.39 | | | | | | | | | | | |
| | P.G.7 | | | | | | | | | | | |
| | P.G.36 | | | | | | | | | | | |
| | P.B.15:6 | | | | | | | | | | | |
| | P.B.25 | | 3.0 | | | | | | | | | |
| | P.B.60 | | | 3.0 | | | | | | | | |
| | P.B.15:3 | | | | | | | | 3.0 | | | |
| | P.R.122 | | | | | | | | | 3.0 | | |
| | P.Y.155 | | | | | | | | | | 3.0 | |
| | Carbon black | | | | | | | | | | | 3.0 |
| Dispersant | Solsperse36000 | | 1.0 | 1.0 | 1.0 | 1.0 | 1.0 | 1.0 | 1.0 | 1.0 | 1.0 | 1.0 |
| | Total | | 100 | 100 | 100 | 100 | 100 | 100 | 100 | 100 | 100 | 100 |
| Physical property | Monofunctional monomer rate in polymerizable compounds | 78 or more | 86 | 86 | 97 | 76 | 86 | 86 | 86 | 86 | 86 | 86 |
| | Tg of monomer (° C.) | 48° C. or more | 51 | 51 | 52 | 57 | 51 | 51 | 51 | 51 | 51 | 51 |
| | N-vinyl compound rate in polymerizable compounds | 5% or less | 0 | 0 | 6 | 0 | 0 | 0 | 0 | 0 | 0 | 0 |

| | | Example 23 | Example 24 | Example 25 | Comparative example 1 | Comparative example 2 | Comparative example 3 |
|---|---|---|---|---|---|---|---|
| Evaluation of coating film | Color weather resistance | B | A | A | A | D | A |
| | Coating film cracking | A | A | A | B | A | A |
| | Smoothness | A | A | C | A | A | A |
| | Improvement in coverage of color gamut | B | B | A | A | D | D |
| | Stretching property | B | B | A | D | B | B |
| | Abrasion resistance | B | B | C | A | B | B |

The components shown in the above Tables 1 to 3 will be further explained.

Monomer

NVC (trade name "V-CAP", N-vinyl caprolactam, manufactured by ISP Japan)

VMOX (vinyl methyl oxazolidinone, manufactured by BASF)

THFA (trade name "V#150", tetrahydrofurfuryl acrylate, manufactured by Osaka Organic Chemical Industry Ltd.)

DCPA (trade name "FA-511AS", dicyclopentenyl acrylate, manufactured by Hitachi Chemical Co., Ltd.)

IBXA (trade name, isobornyl acrylate, manufactured by Osaka Organic Chemical Industry Ltd.)

PEA (trade name "Viscoat#192", phenoxyethyl acrylate, manufactured by Osaka Organic Chemical Industry Ltd.)

ACMO (trade name, acryloylmorpholine, manufactured by JF Chemicals Co., Ltd.)

BZA (trade name "V#160", benzyl acrylate, manufactured by Osaka Organic Chemical Industry Ltd.)

VEEA (trade name, 2-(2-vinyloxyethoxy)ethyl acrylate, manufactured by Nippon Shokubai Co., Ltd.)

DPGDA (trade name "APG-100", dipropylene glycol diacrylate, manufactured by Shin-Nakamura Chemical Co., Ltd.)

Polymerization Initiator 819 (trade name "Omnirad 819", bis(2,4,6-trimethylbenzoyl)phenylphosphine oxide, manufactured by IGM Resins B.V.)

TPO (trade name "Speedcure TPO", (2,4,6-trimethylbenzoyl-diphenylphosphine oxide, manufactured by Lambson)

Polymerization Inhibitor

MEHQ (trade name, hydroquinone monomethyl ether, manufactured by Kanto Chemical Co., Inc.)

Slipping Agent
BKY-UV3500 (trade name, polyether modified-polydimethylsiloxane, manufactured by BYK Japan KK)
Colorant
P.O. 36 (C.I. Pigment Orange 36)
P.O. 38 (C.I. Pigment Orange 38)
P.O. 43 (C.I. Pigment Orange 43)
P.O. 64 (C.I. Pigment Orange 64)
P.O. 71 (C.I. Pigment Orange 71)
P.O. 13 (C.I. Pigment Orange 13)
P.R. 177 (C.I. Pigment Red 177)
P.R. 179 (C.I. Pigment Red 179)
P.R. 224 (C.I. Pigment Red 224)
P.R. 254 (C.I. Pigment Red 254)
P.R. 255 (C.I. Pigment Red 255)
P.R. 175 (C.I. Pigment Red 175)
P.V. 23 (C.I. Pigment Violet 23)
P.V. 32 (C.I. Pigment Violet 32)
P.V. 37 (C.I. Pigment Violet 37)
P.V. 39 (C.I. Pigment Violet 39)
P.G. 7 (C.I. Pigment Green 7)
P.G. 36 (C.I. Pigment Green 36)
P.B. 15:6 (C.I. Pigment Blue 15:6)
P.B. 25 (C.I. Pigment Blue 25)
P.B. 60 (C.I. Pigment Blue 60)
P.B. 15:3 (C.I. Pigment Blue 15:3)
P.R. 122 (C.I. Pigment Red 122)
P.Y. 155 (C.I. Pigment Yellow 155)
carbon black (carbon black pigment) Dispersant
Solsperse 36000 (trade name, polymer dispersant, manufactured by Lubrizol)

3.2. Evaluation Method 3.2.1. Evaluation of Color Weather Resistance

By using an ink jet printer "PX-G5000" (manufactured by Seiko Epson Corporation), the ink jet compositions obtained as described above were filled in respective nozzle lines. On a PVC film (trade name "IJ180-10, manufactured by 3M Company), printing was performed at ordinary temperature and normal pressure by an ink with a medium-size dot diameter while the duty was adjusted so that an initial OD value was 0.5, 1.0, or the maximum value, and in addition, after first radiation was performed at a wavelength of 385 nm by an UV-LED provided in an ultraviolet radiation device disposed beside a carriage to have a radiation intensity of 100 mW/cm$^2$, second radiation was performed at a wavelength of 395 nm to have a cumulative light amount of 700 mJ/cm$^2$ at a radiation intensity of 1,000 mW/cm$^2$, so that an image was cured. As described above, a recorded matter in which the image was formed on the PVC film was formed.

Subsequently, the recorded matter thus obtained was placed in a chamber of a xenon weather meter (manufactured by Suga Test Instruments Co., Ltd.), and a cycle test was performed on the recorded matter under the test conditions shown in the following Table 4, the cycle test being performed in this order from "light radiation for 40 minutes", "light radiation+waterfall for 20 minutes", "light radiation for 60 minutes", and "waterfall for 60 minutes". This cycle test was continuously performed for 12 weeks, and the recorded matter was recovered after 12 weeks. The OD value of the recorded matter was measured using a Gretag densitometer (manufactured by Gretag Macbeth), and a remaining rate (%) of the OD value was obtained. Among the three types of recorded matters having initial OD values of 0.5, 1.0 and the maximum value, a recorded matter having the lowest remaining rate was used for the evaluation. The weather resistance was evaluated in accordance with the following criteria.

Evaluation Criteria
A: OD value remaining rate of 90% or more
B: OD value remaining rate of 80% to less than 90%
C: OD value remaining rate of 70% to less than 80%
D: OD value remaining rate of less than 70%

TABLE 4

| Cycle segment | Time (Minutes) | Radiation intensity 340 nm (W/m$^2$) | Radiation intensity 300-400 nm (W/m$^2$) | BPT (° C.) | Chamber temperature (° C.) | Relative humidity (%) | Pure water spray |
|---|---|---|---|---|---|---|---|
| 1 | 40 | 0.55 ± 0.02 | 60 ± 2 | 63 ± 2 | 40 ± 2 | 50 ± 6 | None |
| 2 | 20 | 0.55 ± 0.02 | 60 ± 2 | 63 ± 2 | 40 ± 2 | — | Front |
| 3 | 60 | 0.55 ± 0.02 | 60 ± 2 | 63 ± 2 | 40 ± 2 | 50 ± 6 | None |
| 4 | 60 | 0 | 0 | 38 ± 2 | 38 ± 2 | — | Front |

3.2.2. Evaluation of Coating Film Cracking

The coating film of the recorded matter, which was processed by the cycle test continuously performed for 12 weeks in the above "3.2.1. Evaluation of Color Weather Resistance", was checked by visual inspection and was then evaluated in accordance with the following evaluation criteria.

Evaluation Criteria
A: No peeling of coating film is observed.
B: Cracking and peeling of coating film are observed.

3.2.3. Evaluation of Smoothness (Color Development Property)

A cross-section roughness Rz (μm) of the coating film of the recorded matter formed in the above "3.2.1. Evaluation of Color Weather Resistance" was measured using an interference microscope and was then evaluated in accordance with the following evaluation criteria. As the cross-section roughness Rz (μm) is decreased, the glossiness is improved, and hence the color development property is further improved.

Evaluation Criteria
A: 0.85 or less
B: more than 0.85 to less than 1.00
C: 1.00 or more 3.2.4. Evaluation of Improvement in Coverage of Color Gamut By using an ink jet printer, "PX-G5000" (manufactured by Seiko Epson Corporation), the ink jet composition obtained in one of Examples and Comparative Examples was filled in nozzle lines in combination with the CMYK ink jet compositions. A solid pattern image was printed at ordinary temperature and normal pressure on a PVC film (trade name "IJ180-10", manufactured by 3M Company) by an ink with a medium-size dot diameter so that a printed matter had a film thickness of 10 μm, and in addition, after first radiation was performed at a wavelength of 385 nm by an UV-LED provided in an ultraviolet radiation device disposed beside a carriage to have a radiation intensity of 100 mW/cm$^2$, second radiation was performed at a wavelength of 395 nm to have a cumulative light amount of 700 mJ/cm$^2$ at a radiation intensity of 1,000 mW/cm$^2$, so that the image was cured. As described above, a recorded matter in which the image was formed on the PVC film was formed.

In addition, by using an ink jet printer "PX-G5000" (manufactured by Seiko Epson Corporation), the CMYK ink jet compositions obtained as described above were filled in respective nozzle lines, and a recorded matter was formed in a manner similar to that described above.

The coverages of those two recorded matters were measured with reference to "Pantone (registered trademark)" color chart, and the degree of improvement in coverage of the recorded matter of one of Examples and Comparative Examples with respect to that of the recorded matter formed only using the CMYK ink jet ink compositions was evaluated in accordance with the following evaluation criteria. In addition, the coverage of the color gamut is to be derived from the pigment.

Evaluation Criteria
A: 5% or more
B: 3% to less than 5%
C: 2% to less than 3%
D: 0% to less than 2%

3.2.5. Evaluation of Stretching Property

The ink jet compositions obtained as described above were each applied on a poly(vinyl chloride) film (trade name "JT5829R", manufactured by MACtac) by a bar coater to have a thickness of 10 μm. Next, by using a metal halide lamp (manufactured by Eye Graphics Co., Ltd.), the ink jet composition was cured with an energy of 400 mJ/cm$^2$ to form a coating film. The coating film described above was peeled away from the poly(vinyl chloride) film used as release paper and was cut into strip shapes each having a width of 1 cm and a length of 8 cm, so that test pieces were formed. The elongation rate of each test piece was measured as the flexibility by a tensile test machine (trade name "TENSILON", manufactured by ORIENTEC). The elongation rate was a value obtained when a crack was generated at a tensile rate of 5 mm/min. The elongation rate was calculated by the following equation. The evaluation criteria are shown below.

Elongation rate={(length at crack generation-length before stretching)]/length before stretching×100}

Evaluation Criteria
A: 300% or more
B: 250% to less than 300%
C: 200% to less than 250%
D: less than 200%

3.2.6. Evaluation of Abrasion Resistance

The cured coating film formed in the "3.2.5. Evaluation of Stretching Property" was evaluated by a microscratch test in accordance with JIS R3255. For the measurement, an ultra thin film scratch tester (trade name "CSR-5000", manufactured by Nanotech Corporation) was used, and as the abrasion resistance, a load resistance was measured. The load resistance represents a load at which a stylus reached a medium surface when microscratch is performed with a load application. This measurement was performed under conditions in which a stylus diameter was 15 μm, the amplitude was 100 μm, and a scratch rate was 10 μm/sec. The evaluation criteria are as described below.

Evaluation Criteria
A: 30 mN/cm$^2$ or more
B: 25 to less than 30 mN/cm$^2$
C: 20 to less than 25 mN/cm$^2$
D: less than 20 mN/cm$^2$ 3.3. Evaluation Results The evaluation results are shown in the above Tables 1 to 3.

According to the above evaluation results, in all Examples, while the coverage of the color gamut was increased, the printed coating film could be prevented from being cracked (coating film cracking) when being installed outside.

On the other hand, in all Comparative Examples, the improvement in coverage of the color gamut and the prevention of cracks (coating film cracking) of the printed coating film generated when the film was installed outside could not be simultaneously satisfied. In particular, in Comparative Example 1, since the content of the monofunctional polymerizable compound was not in the predetermined range, the coating film cracking could not be prevented. In addition, in Comparative Examples 2 and 3, since the specific pigment was not used, the coverage of the color gamut could not be improved.

From the embodiments described above, the following conclusions are obtained.

A radiation curable ink jet composition according to an aspect of the present disclosure comprises: polymerizable compounds; and a colorant. In this radiation curable ink jet composition, the polymerizable compounds includes a monofunctional polymerizable compound in an amount of 78 percent by mass or more with respect to a total mass of the polymerizable compounds, and the colorant includes at least one selected from the group consisting of C.I. Pigment Orange 36, C.I. Pigment Orange 38, C.I. Pigment Orange 43, C.I. Pigment Orange 64, C.I. Pigment Orange 71, C.I. Pigment Red 177, C.I. Pigment Red 179, C.I. Pigment Red 224, C.I. Pigment Red 254, C.I. Pigment Red 255, C.I. Pigment Violet 23, C.I. Pigment Violet 32, C.I. Pigment Violet 37, C.I. Pigment Violet 39, C.I. Pigment Green 7, C.I. Pigment Green 36, C.I. Pigment Blue 15:6, C.I. Pigment Blue 25, and C.I. Pigment Blue 60.

In the radiation curable ink jet composition described above, the colorant may include C.I. Pigment Orange 43 or C.I. Pigment Red 254.

In the radiation curable ink jet composition described above, the polymerizable compounds may include an N-vinyl compound in an amount of 5 percent by mass or less with respect to the total mass of the polymerizable compounds.

In the radiation curable ink jet composition described above, a content of the monofunctional polymerizable compound with respect to the total mass of the polymerizable compounds may be 90 percent by mass or more.

In the radiation curable ink jet composition described above, when the polymerizable compounds form respective homopolymers having glass transition temperatures, the polymerizable compounds may have a weight average glass transition temperature (Tg) of 42° C. or more, the weight average glass transition temperatures being obtained based on mass rates of the respective polymerizable compounds.

An ink set according to another aspect of the present disclosure comprises: a cyan ink composition; a magenta ink composition; a yellow ink composition; a black ink composition; and the radiation curable ink jet composition described above.

The present disclosure is not limited to the embodiments described above and may be variously changed or modified. For example, the present disclosure includes substantially the same structure as the structure described in the embodiment. That is, the substantially the same structure includes, for example, the structure in which the function, the method, and the result are the same as those described above, or the structure in which the object and the effect are the same as those described above. In addition, the present disclosure includes the structure in which a nonessential portion of the structure described in the embodiment is replaced with something else. In addition, the present disclosure includes the structure which performs the same operational effect as that of the structure described in the embodiment or the structure which is able to achieve the same object as that of the structure described in the embodiment. In addition, the present disclosure includes the structure in which a known technique is added to the structure described in the embodiment.

What is claimed is:

1. An ink set comprising:
a cyan ink composition:
a magenta ink composition;
a yellow ink composition:
a black ink composition: and
a radiation curable ink jet composition that includes:
polymerizable compounds; and
a colorant,
wherein the polymerizable compounds includes a monofunctional polymerizable compound in an amount of 78 percent by mass or more with respect to a total mass of the polymerizable compounds,
the colorant includes at least one selected from the group consisting of C.I. Pigment Orange 36, C.I. Pigment Orange 38, C.I. Pigment Orange 43, C.I. Pigment Orange 64, C.I. Pigment Orange 71, C.I. Pigment Red 177, C.I. Pigment Red 179, C.I. Pigment Red 224, C.I. Pigment Red 254, C.I. Pigment Red 255, C.I. Pigment Violet 23, C.I. Pigment Violet 32, C.I. Pigment Violet 37, C.I. Pigment Violet 39, C.I. Pigment Green 7, C.I. Pigment Green 36, C.I. Pigment Blue 15:6, C.I. Pigment Blue 25, and C.I. Pigment Blue 60,
wherein the polymerizable compounds include an N-vinyl compound in an amount of 5 percent by mass or less with respect to the total mass of the polymerizable compounds.

2. The radiation curable ink jet composition according to claim 1,
wherein the colorant includes C.I. Pigment Orange 43 or C.I. Pigment Red 254.

3. The radiation curable ink jet composition according to claim 1,
wherein a content of the monofunctional polymerizable compound with respect to the total mass of the polymerizable compounds is 90 percent by mass or more.

4. The radiation curable ink jet composition according to claim 1, wherein the polymerizable compounds have a weight average glass transition temperature (Tg) of 42° C. or more that is calculated according to $Tg_{All}=\Sigma Tg_N \times X_N$,
where $Tg_N$ is a glass transition temperature of a homopolymer derived from a respective polymerizable compound contained in the radiation curable ink jet composition, N represents a number of the polymerizable compounds contained in the radiation curable ink jet composition, and X is an amount in percent by mass of the polymerizable compounds contained in the radiation curable ink jet composition.

5. A radiation curable ink jet composition comprising:
polymerizable compounds; and
a colorant,
wherein the polymerizable compounds includes a monofunctional polymerizable compound in an amount of 78 percent by mass or more with respect to a total mass of the polymerizable compounds, and an N-vinyl compound in an amount of 5 percent by mass or less with respect to the total mass of the polymerizable compounds,
the colorant includes at least one selected from the group consisting of C.I. Pigment Orange 36, C.I. Pigment Orange 38, C.I. Pigment Orange 43, C.I. Pigment Orange 64, C.I. Pigment Orange 71, C.I. Pigment Red 177, C.I. Pigment Red 179, C.I. Pigment Red 224, C.I. Pigment Red 254, C.I. Pigment Red 255, C.I. Pigment Violet 23, C.I. Pigment Violet 32, C.I. Pigment Violet 37, C.I. Pigment Violet 39, C.I. Pigment Green 7, C.I. Pigment Green 36, C.I. Pigment Blue 15:6, C.I. Pigment Blue 25, and C.I. Pigment Blue 60,
wherein the polymerizable compounds have a weight average glass transition temperature (Tg) of 42° C. or more that is calculated according to $Tg_{All}=\Sigma Tg_N \times X_N$,
where $Tg_N$ is a glass transition temperature of a homopolymer derived from a respective polymerizable compound contained in the radiation curable ink jet composition, N represents a number of the polymerizable compounds contained in the radiation curable ink jet composition, and X is an amount in percent by mass of the polymerizable compounds contained in the radiation curable ink jet composition.

* * * * *